Dec. 20, 1966          A. R. WILLIAMS          3,292,977
AIRPLANE BRAKE CONTROL
Filed Sept. 27, 1963          5 Sheets-Sheet 3
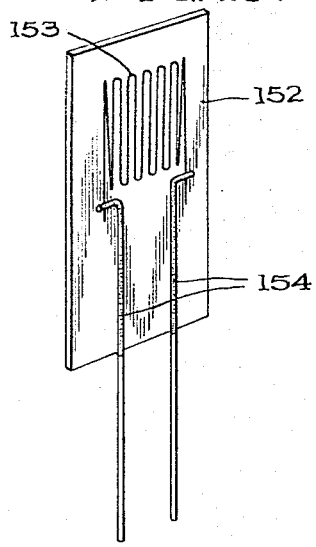
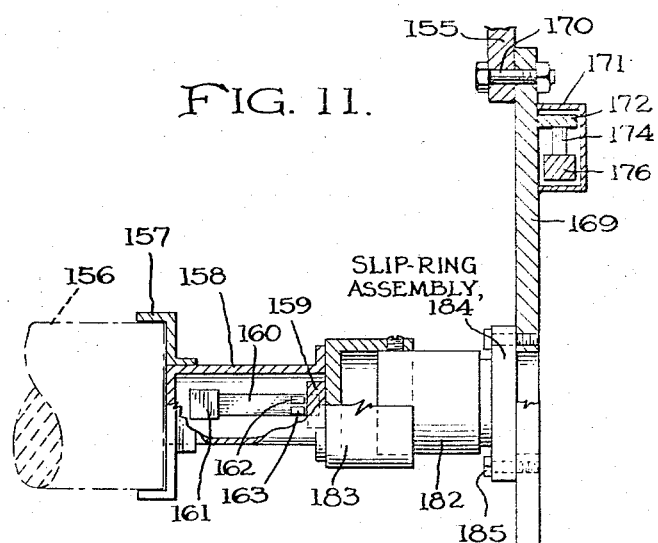
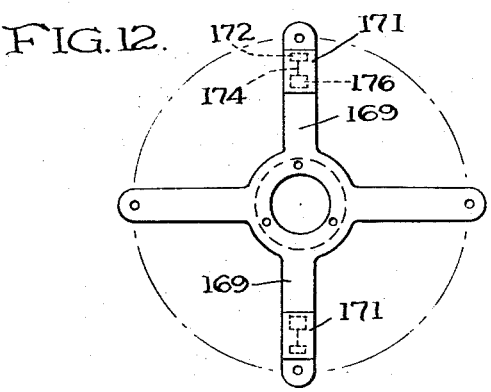
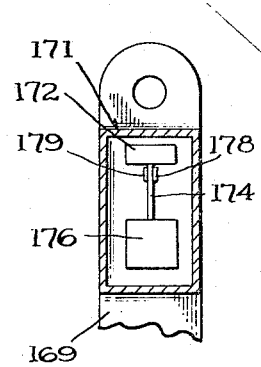
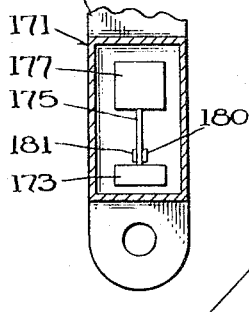
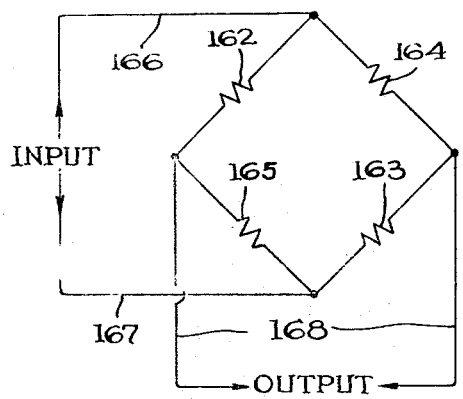
INVENTOR
ALLISON R. WILLIAMS
BY Cameron, Kerkam & Sutton
ATTORNEYS United States Patent Office 3,292,977
Patented Dec. 20, 1966

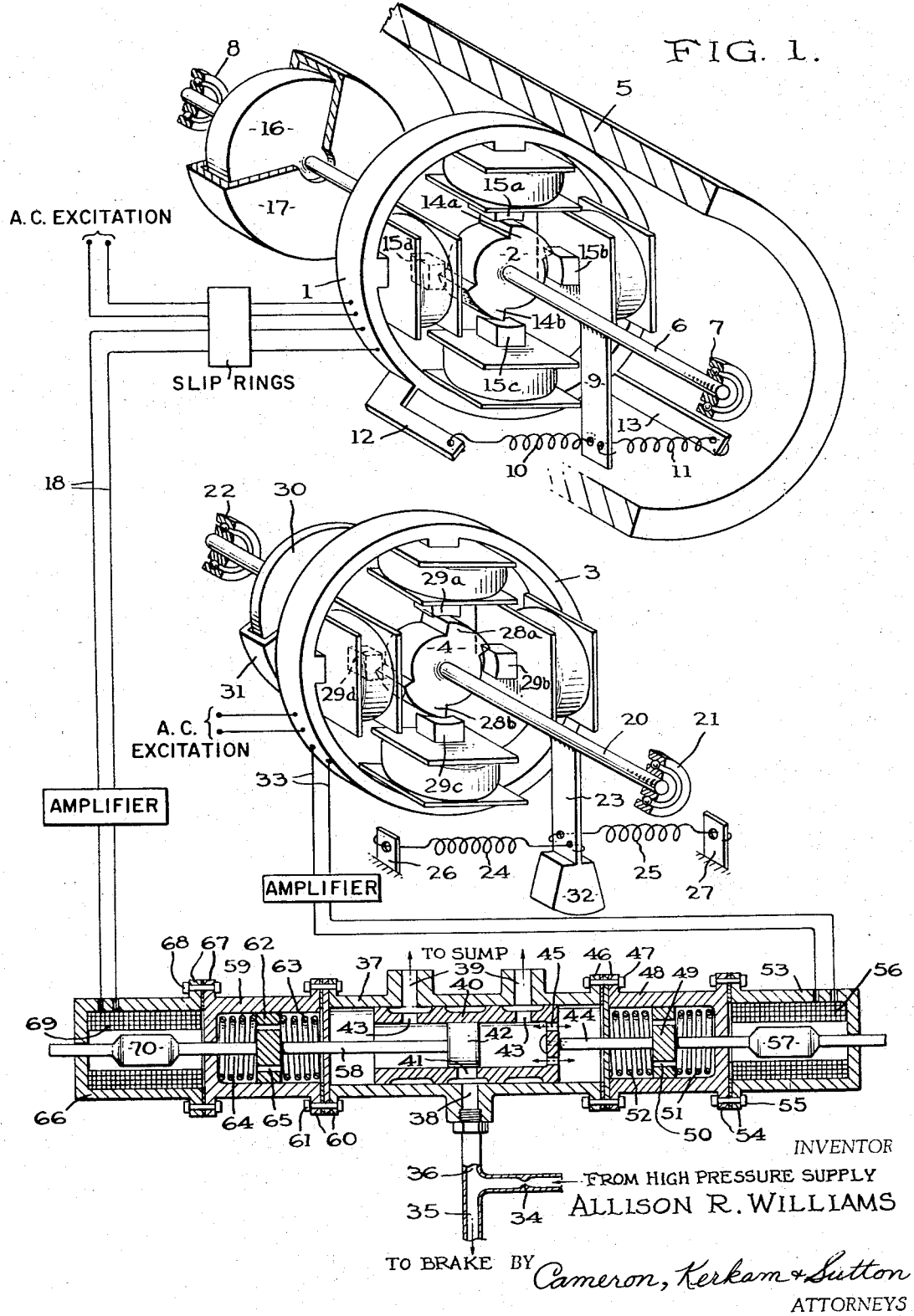

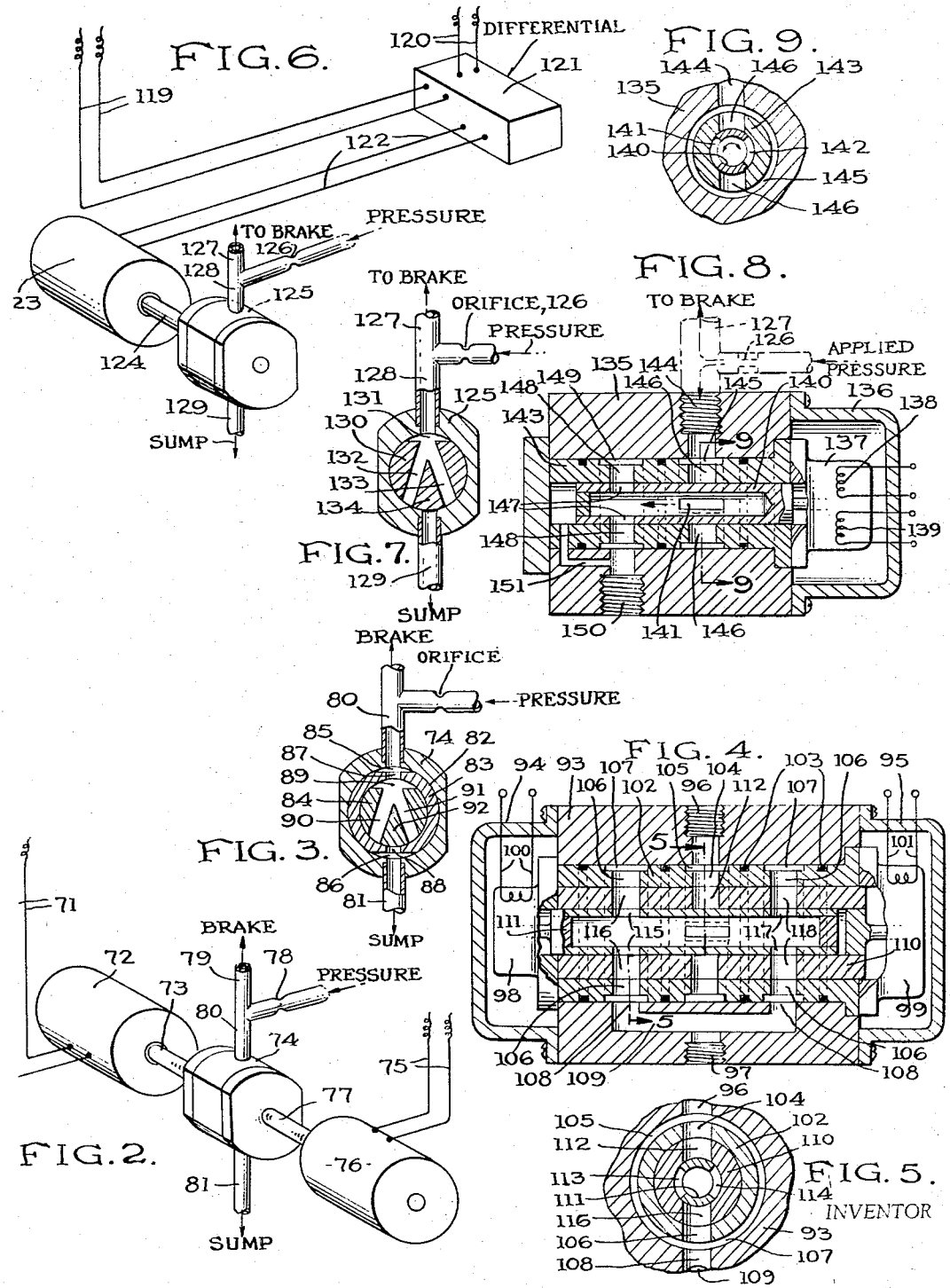

3,292,977
AIRPLANE BRAKE CONTROL
Allison R. Williams, 380 Newbury St.,
Danvers, Mass. 01104
Filed Sept. 27, 1963, Ser. No. 315,108
3 Claims. (Cl. 303—21)

This application is a continuation-in-part of my prior copending application Serial No. 171,956, filed February 8, 1962, for Airplane Brake Control, now abandoned.

This invention relates to means for controlling the acceleration of a rotating body by an absolute value comparison of the rate of change of its angular velocity (i.e., its actual angular acceleration) with the rate of change of its linear velocity (i.e., its linear acceleration).

The invention will be described hereinafter with particular reference to the control of the braking effort applied to aircraft landing wheels so as to minimize or prevent locking of a wheel and consequent skidding rather than rolling contact of the tire with the runway surface. It has been proposed heretofore to control airplane wheel braking by an inertia member rotating with or driven from part of the wheel itself. The inertia member is usually held in a neutral position relative to the wheel (i.e., rotating therewith) by suitable friction means, springs, or the like, but is angularly displaced relative to the wheel when the acceleration of the wheel increases beyond a predetermined value empirically set depending on the friction or spring setting. This degree of overrun of the inertia member is utilized to close an electric circuit and to energize means whereby the braking effort is temporarily relieved, partially or wholly. In such systems, the overrun of the inertia member for any spring setting is a function of the actual angular acceleration of the wheel.

Prior Patents Nos. 2,529,885, granted November 14, 1950, and 2,920,924, granted January 12, 1960, disclose a more accurate brake control system in which absolute values of actual angular acceleration of the wheel and of linear acceleration of the wheel are compared.

Assuming that the vehicle wheel maintains the conditions of complete rolling contact with the supporting surface without slippage, the linear acceleration and change of linear velocity of the wheel must be accompanied by corresponding and directly proportional angular acceleration and change of angular velocity of the wheel. Thus it will be seen that the linear acceleration of the wheel provides an accurate standard of reference against which the actual angular acceleration of the wheel can be compared to determine how closely its actual performance approaches the ideal.

It is known that the optimum conditions of friction between the tire surface and the runway surface occur at about 10% to 17% slippage, and that at the maximum coefficient of friction, which occurs at about 20% slippage, heating of the tire becomes excessive and the tread begins to soften and melt so that the coefficient of friction approaches zero. As long as the amount of slippage is within the desirable range (i.e., up to about 10–17%), the difference between the forces is small and the valve control system is arranged so that there is no effect on the braking pressure. In the case of undesirably high slippage, however, the difference reaches or exceeds a predetermined limiting value and becomes effective through suitable valve actuating and control means to reduce the brake pressure. Preferably the amount of such reduction increases progressively as the difference increases beyond the predetermined limiting value, but for some purposes it may be satisfactory merely to relieve the brake pressure entirely when the absolute differential exceeds the desired value.

The principal objects of the present invention are to provide a system of the above type with high integrity of response, to reduce the weight of the parts and at the same time to reduce frictional effects to a very minimum. The result is a simple light-weight system in miniature which has very high accuracy, sensitivity, and integrity of response.

To accomplish these objectives the present invention utilizes devices responsive respectively to linear and angular deceleration forces for producing electrical outputs proportional to these forces.

In a second embodiment, the electrical outputs proportional to linear and angular deceleration forces are produced by the use of three simple accelerometers. This is accomplished by the use of a linear accelerometer responsive to linear acceleration, and by the use of a pair of additional accelerometers which are responsive to both linear and angular accelerations but are arranged so as to cancel the effect of linear acceleration and to measure only angular acceleration.

Preferably in the above mentioned second embodiment the three accelerometers comprise strain gages suitably mounted and connected as described by way of example hereinafter. The strain gage per se may be of any suitable type known to the art, such as bonded or unbonded wire gages, etched foil gages, semiconductor gages, and the like. One well known form of bonded wire gage comprises a flat wire grid of metal such as constantan mounted on a base of bakelite or the like, and reference hereinafter to strain gages may be understood as referring to gages of this type for purposes of illustration.

In many cases it is advantageous to use two valve parts, each moving by an amount proportional to one of said electrical outputs, said two parts being movable together with each other while closed and also relatively to one another to a relative position in which the valve is open. Thus the entire output of each device, without reduction as in the above cases, is available to move one valve part and any difference in these outputs will cause a difference in the amount of displacement of the valve parts relative to one another. Said valve parts can be arranged so as to move to initial opening position when the difference in the electrical outputs reaches a predetermined value, after which any further increase above said predetermined value causes a corresponding increase in valve port opening and reduction of brake torque to limit slippage and to return said relatively movable parts toward said initial opening position.

It will also be understood that in any of these cases, use may be made of any suitable electrohydraulic servo valves.

In any of the above cases, it will be understood that the valve may be either a linearly moving type or an angularly moving type.

Several embodiments of the invention have been illustrated by way of example in the accompanying drawings, but it is to be expressly understood that these embodiments are for purposes of illustration only and that the drawings are not be construed as a definition of the limits of the invention, reference being had to the appended claims for this purpose.

In the drawings,

FIG. 1 shows diagrammatically a system of the type mentioned above in which the transformer outputs are each utilized to effect movement of two valve parts relative to each other, the valve being shown as of the linearly movable type;

FIGS. 2 and 3 illustrate diagrammatically a system similar to that of FIG. 1 but having a rotary type valve, FIG. 3 being a vertical section taken centrally through the valve body;

FIG. 4 illustrates in section a suitable practical design of rotary valve for use in a system such as shown by FIGS. 2 and 3;

FIG. 5 is a section on the line 5—5 of FIG. 4;

FIG. 6 shows diagrammatically a system in which the two transformer outputs are compared electrically and the electrical difference between them is converted into a single mechanical valve-positioning force;

FIG. 7 shows diagrammatically a suitable rotary valve for use in the system of FIG. 6;

FIG. 8 illustrates in section a suitable practical design of rotary valve for use in a system such as shown in FIG. 6;

FIG. 9 is a section on the line 9—9 of FIG. 8;

FIG. 10 shows in somewhat diagrammatic fashion a bonded wire type strain gage referred to herein by way of example of such devices as stated above;

FIG. 11 shows a suitable arrangement for mounting the strain gage devices on the vehicle in association with the vehicle wheel and its axle;

FIG. 12 is a side view of a mounting spider which forms part of the assembly shown in FIG. 11;

FIG. 13 is a detailed view of the ends of radically opposite arms of the mounting spider and the inertia masses and strain gages carried thereby; and FIG. 14 is a circuit diagram showing the preferred manner of connecting the strain gages for accomplishing the purposes of the present invention.

Referring now to FIG. 1, two dynamo transformers are shown diagrammatically as comprising a suitable stator 1 and rotor 2 forming one unit and a stator 3 and rotor 4 forming a second unit. One of these units, in this case the dynamo transformer, 1, 2, is arranged to produce an output voltage proportional to the angular displacement of its rotor 2, this displacement in turn being proportional to rotation of an inertia member relative to the vehicle wheel in response to negative angular acceleration of the wheel. In the form shown, these results are accomplished very simply and effectively by mounting the stator 1 so as to rotate with the wheel, preferably by a fixed connection between the stator and the wheel such as can be obtained by mounting the stator in a suitable part of the wheel hub indicated diagrammatically at 5. Normally the rotor 2 is rotated in synchronism with the stator and the wheel through a yieldable connection as explained above. This is readily accomplished by providing the rotor shaft 6, which rotates freely in suitable ball bearings 7 and 8, with a depending arm 9 connected by suitable springs 10 and 11 with extensions 12 and 13 respectively on the stator. It will be seen that as a result of this arrangement, the rotor 2 is yieldingly constrained with the stator 1 so that the poles 15a and 15b of the stator normally maintain a neutral position of symmetry with respect to pole 14a of the rotor 2. Likewise the poles 15c and 15d of the stator normally maintain a neutral position of symmetry with respect to pole 14b of rotor 2. Under these conditions it will be understood that no voltage is generated in the output winding 18.

An inertia member is suitably connected for rotation with the rotor 2, preferably by mounting a small inertia disc or fly wheel 16 on the rotor shaft 6. If desired, any suitable damper means can be provided as indicated diagrammatically by the casing 17 around the inertia member 16. The rotating mass 16, together with the rotating mass of the rotor 2 itself, tend to overrun the stator 1 and wheel hub 5 (or to lag behind) in case of change of angular velocity of the wheel such as is caused by application of the wheel brake. Such overrun is permitted but restrained by the springs 10, 11, and the extent of overrun as well as the corresponding extent of angular displacement of the rotor 2 will thus depend upon the rate of change of angular velocity and the tension of the springs 10, 11. Such displacement of the rotor 2 relative to its stator 1 generates a corresponding voltage in the output circuit leads 18 of the transformer, slip rings or the like being provided in the usual manner.

The second dynamo transformer is arranged to generate an output voltage proportional to the displacement of the rotor 4 relative to its stator 3, this displacement in turn being proportional to the rate of change of linear velocity of the wheel. The stator 3 can be mounted non-rotatively in any suitable manner and at any suitable point so as to be subject to the linear motion of the wheel. The rotor 4 has a shaft 20 rotating freely in suitable bearings 21 and 22, this shaft having a depending arm 23 connected by springs 24 and 25 with suitable fixed abutments 26 and 27 respectively. Normally, therefore, the springs 24 and 25 maintain the arm 23 and therewith the rotor 4 in a neutral position with respect to the stator 3, the rotor poles 28a and 28b and the stator poles 29a, 29b, and 29c and 29d being so related that no output voltage is generated as long as these conditions are maintained. A suitable damping means, such as the disc 30 rotating in a casing 31, may be employed to prevent undesirable oscillation of the shaft 20.

Angular displacement of the rotor 4 relative to the stator 3 takes place in response to rates of change in linear velocity of the wheel by virtue of a pendulous mass 32 suspended on the arm 23 connected to the rotor shaft. It will be seen that when the wheel velocity changes, the mass 32 tends to move in the forward or rearward direction (depending on whether linear velocity is decreasing or increasing) under the control of the springs 24, 25, thus causing rotation of the shaft 20 and of the rotor 4 thereon by an amount proportional to the rate of change in linear velocity of the wheel. This angular displacement of the rotor results in the generation of an output voltage proportional thereto in the leads 33 of the transformer output circuit.

Braking pressure is supplied through a restricted orifice 34 in the brake pressure line coming from the pressure supply source (not shown) and leading to connection 35 which runs to the brake. Regulation of the effective braking pressure is provided by bypass connection 36 which leads to a valve casing 37 containing a two part valve assembly of the type referred to above, each part being operated independently by the output from one of the rotary transformer circuits 18 or 33. As shown, the cylindrical valve casing is provided with an inlet port 38 and two outlet ports 39 which lead to the sump. Slidable in the cylinder is a valve spool 40 having an inlet passage 41 communicating with the valve port 38 but normally closed by a piston valve 42 inside the spool. When the piston is displaced sufficiently relative to the spool, however, pressure fluid can pass through port 38 and passage 41 into the interior of the spool and thence escape through one or the other of two passages 43 leading to the outlet ports 39. As will be seen, the surface of the spool is provided with suitable annular grooves to maintain flow of liquid to and from the various ports and passages throughout a predetermined range of axial movement of the spool in the casing.

The spool itself is secured to and moved by a valve rod 44, the head of the spool being provided with breather holes 45 so that the spool can move back and forth in the cylinder. Secured to the spool casing in any suitable manner, as by means of flanges 46 and bolts 47, is a casing section 48 through which the rod 44 extends, carrying a piston member 49 with breather holes 50 between two centering springs 51 and 52. At the outer end of the casing section 48, a further casing section 53 is similarly secured to the section 48 by means of flanges 54 and bolts 55. This casing extension serves to house the coil 56 of a solenoid which is energized from the output leads 33 of the rotary transformer 3, 4. The armature 57 of the solenoid preferably forms part of the valve rod 44.

The piston 42 is mounted on the end of a valve stem 58 so that it can move longitudinally inside the spool. The casing section 59 is secured to the casing 37 by flanges 60 and bolts 61, the valve stem 58 passing through this casing section and carrying a piston 62 centered between two springs 63 and 64 and provided with breather ports 65. A still further casing section 66 is mounted on the end of the section 59 by means of flanges 67 and bolts 68 and houses the coil 69 of a solenoid that is energized by the output leads 18 of the rotary transformer 1, 2. Again the armature 70 preferably forms part of the valve stem.

As shown, the valve ports are in their neutral positions in which there is no escape of pressure liquid through the bypass 38. As long as there is no unbalance between the outputs of the rotary transformers, this condition remains because the armature 57 will move the valve spool 40 in the same direction and by the same amount that the armature 70 moves the piston 42. This will be the case even after application of the brakes and during resulting deceleration of the wheel and vehicle, as long as true rolling contact is maintained so that the negative angular acceleration and negative linear acceleration correspond to one another. In case of slippage, however, the effect of the braking action is to slow down the rotation of the wheel and thus to increase the negative angular acceleration relative to the negative linear acceleration. Whenever this (or the converse) occurs, the output of one of the rotary transformers predominates so that the valve parts 40 and 42 no longer move in synchronism. It will be observed that due to the lap of the piston 42 over the passage 41, a certain amount of relative movement can take place without opening the valve passage 41, and thus a predetermined amount of acceleration difference can take place without any bypassing action. This may be the case, for example, up to say 10% to 17% slippage. At a point within some such range, however, the initial opening of the valve passage 41 by the piston 42 takes place with the result that the brake pressure is reduced proportionally, with a corresponding decrease in the braking effect on the wheel thereby tending to maintain a controlled optimum braking torque within this desirable range of slippage. Preferably the parts will be arranged so that the valve passage 41 reaches its maximum opening at slippage in the neighborhood of 17% as explained above. Of course, as soon as the vehicle stops or reaches a constant speed, the rotors 3 and 4 of the dynamo transformers are returned to neutral positions by their springs, and there is no longer any electrical output so that the solenoids are de-energized. The valve spool and piston are then returned to the normal position shown in the drawings by their centering springs 51, 52 and 63, 64.

As indicated above, FIGS. 2 and 3 illustrate diagrammatically a system similar to that described above but utilizing relatively rotatable valve parts each actuated by the output from one of the rotary transformers. In FIG. 2, the leads 71 from one of the rotary transformers energize any suitable type of electromagnetic torque motor 72 having a shaft 73 extending into the valve casing 74 for rotating one of the valve parts. Similarly, the leads 75 from the other rotary transformer energize a suitable electromagnetic torque motor 76 having a shaft 77 which also extends into the valve casing 74 for rotation of the other valve part. Brake operating pressure fluid from a suitable supply passes through a restricted orifice indicated at 78 and then to the brake through the line 79, but can be bypassed to the valve casing 74 by means of the bypass line 80. After passing through the valve 74, the pressure fluid goes eventually to the sump through the discharge line 81.

FIG. 3 illustrates in diagrammatic section the principles of operation of such a two-part rotary valve. The valve casing 74 has a circular bore 82 within which a sleeve 83 is rotatable by one of the shafts 73 or 77. The valve plug 84 is rotatable within the sleeve 83 by the other of the two shafts 73 and 77. As shown at 85 and 86, the outer surface of the sleeve 83 is grooved or flatted for circumferential distances large enough to maintain communication between the pipe 80 and the valve port 87 in the sleeve throughout the range of rotation of the sleeve, and similarly between the valve port 88 in the sleeve and the pipe 81 which discharges to the sump. The inner plug 84 is similarly provided with a flatted or grooved portion 89 of sufficient circumferential extent to maintain communication between the sleeve port 87 and one or the other of two passages 90 and 91 throughout a desired range of relative rotation between the valve plug and the sleeve.

As shown in FIG. 3, the flow through the valve is normally blocked due to the fact that passages 90 and 91 are closed at their ends by the sleeve 83, the outlet port 88 in the sleeve being covered by the plug section 92 between the ends of the passages 90 and 91. Only after the plug 84 is rotated within and relative to the sleeve 83 by a predetermined amount sufficient to cause the section 92 of the valve plug to uncover the sleeve port 88 does it become possible for the brake fluid to be bypassed through the valve to the sump. The lap of the plug section 92 on both sides of the sleeve port 88 determines the extent of the predetermined range within which slippage can occur without bypassing the brake fluid, e.g., up to about 10–17% slippage as indicated above.

In the practical utilization of valve arrangements such as are illustrated by FIG. 3, provision will preferably be made for balancing of forces, at least statically, and for symmetrical arrangement of the parts for convenience of manufacture and assembly. FIGS. 4 and 5 illustrate a design of valve which can be used to advantage to accomplish these objectives. The valve comprises a cylindrical casing 93 having two small housings 94 and 95 on its ends. The bypass connection to the brake pressure line is made at 96 and the discharge connection to the sump at 97. The housings 94 and 95 enclose suitable torque motors indicated diagrammatically at 98 and 99, these being energized by leads 100 and 101 corresponding to the leads 71 and 75 of FIG. 2.

A stationary sleeve 102 is inserted in the casing 93 and secured therein in any suitable manner, leakage of the pressure fluid between the sleeve and the casing being suitably prevented as by one or more sealing rings 103 therebetween. The sleeve 102 has diametrically opposed ports 104 both communicating with the inlet passage 96 of the outer casing 93 by virtue of a circumferential channel 105 around the sleeve. The sleeve is also provided adjacent its opposite ends with pairs of diametrically opposed ports 106, these ports being preferably so arranged for symmetry and balance. Pressure fluid can escape through these ports into circumferential channels 107 on the outer circumference of the sleeve 102, these channels each being in communication with a port 108 in the valve casing 93 and the ports 108 being connected by a channel 109 communicating with the discharge opening 97. Preferably and as shown, the sleeve 102 is arranged so that ports 106 are aligned with the ports 108 in the valve casing.

The sleeve 102 houses independently rotatable parts which correspond to the sleeve 83 and the plug 84 of FIG. 3. As shown, these parts comprise an outer rotary valve sleeve 110 suitably connected at one end to and operated by the torque motor 99, and having its other end open to receive an inner rotary valve sleeve 111 which is connected at one end to and operated by the torque motor 98, the opposite end of said inner sleeve being suitably closed. The outer valve sleeve 110 has inlet ports 112 diametrically opposed to each other and aligned with inlet ports 104 of the stationary sleeve 102, the ports 104 and 112 being of sufficient circumferential extent to maintain communication throughout the range of rotation of the valve sleeve 110, and functioning in this respect like the flatted portion 85 of the sleeve 83 of FIG. 3. However, bypassing of the brake fluid is normally prevented by the inner valve sleeve 111 which blocks the ports 112 as shown in FIG. 5 and overlaps these ports on both sides by a predetermined amount corresponding to the lap provided by the plug part 92 of FIG. 3. In the event of relative rotation between the inner sleeve 111 and the outer sleeve 110 beyond this predetermined amount in either direction, however, the ports 113 and 114 will be moved into communication with the ports 112, allowing the brake pressure fluid to pass from the casing inlet port 96 through the channel 105 and ports 104, 112, and 113, 114 into the interior of the inner valve sleeve.

Adjacent both ends, the inner valve sleeve is also provided with outlet ports in communication with outlet ports in the outer valve sleeve 110 so that brake pressure fluid may escape freely from the interior of the inner valve sleeve in the sump discharge 97 at all times. Preferably these outlet ports are arranged for symmetry and balance in a manner similar to the inlet ports already described. As shown, the inner sleeve has diametrically opposed outlet ports 115 adjacent its left hand end which register with outlet ports 116 in the outer valve sleeve 110, the latter ports registering with the outlet ports 106 in the stationary sleeve 102. Similarly, adjacent its other end the inner valve sleeve is provided with diametrically opposed outlet ports 117 which register with outlet ports 118 in the outer valve sleeve 110, the latter ports registering with the outlet ports 106 in the stationary sleeve 102.

Thus at any time that fluid under pressure is admitted to the interior of the inner valve sleeve through the inlet ports 113, 114, it can pass freely out through the outlet ports 115 and 117 in the inner valve sleeve, the outlet ports 116 and 118 in the outer valve sleeve, the outlet ports 106 and channels 107 of the stationary sleeve, and the outlet ports 108, channel 109, and the outlet port 97 of the casing.

The operation of the valve shown in FIGS. 4 and 5 will be understood from its correspondence with the diagrammatic showing of FIG. 3. It will be seen that both valve sleeves 110 and 112 can rotate together in either direction, and can also rotate relative to one another by an amount depending upon the valve lap shown in FIG. 5, all without opening the bypass connection between the brake pressure lines and the sump. This condition will exist for zero slippage and up to a predetermined amount of slippage preferably in the range of 10–17% as discussed above. Slippage beyond this predetermined range will cause sufficient relative rotation between the valve sleeves 110 and 112 to result in opening the ports 113 and 114 and thus reducing the brake pressure and decreasing the braking effect.

FIGS. 6 and 7 show diagrammatically a system in which the effective outputs of the two transformers are conducted by the pairs of leads 119 and 120 to a suitable device 121 for obtaining a differential output, and this differential is applied by leads 12 to any suitable electromagnetic torque motor 123 having a shaft 124 which rotates a valve within a valve casing 125 as hereinafter described. Of course, it is not essential to employ a rotary valve with this arrangement. As heretofore indicated, an electrohydraulic valve (rotary or linear) could be employed. As before, the brake fluid from the supply source passes through a suitable orifice indicated at 126 and thence to the brake through the line 127. Pressure fluid can be bypassed, however, through line 128 leading to the valve 125 and from the valve by the line 129 to the sump.

FIG. 7 illustrates in section a suitable rotary valve arrangement. The plug 130 rotates within the casing 125 and is provided with a flat 131 to maintain communication throughout the desired range between the bypass line 128 and the passages 132 and 133 through the valve plug. These passages are normally closed by the valve casing as shown in FIG. 7, the plug part 134 between these passages overlapping the discharge line 129 on both sides. Thus within a predetermined range of rotation of the plug 130, say up to 10–17% slippage, there will be no bypassing effect. When this range is exceeded, however, the rotation of the plug 130 relative to the casing 125 becomes sufficient for one or the other of the passages 132 and 133 to come into registry with the outlet or discharge line 129, thus bypassing the brake fluid to the sump.

FIGS. 8 and 9 illustrate a suitable practical design for performing the operations described in connection with FIGS. 6 and 7. The valve casing 135 has a housing 136 on one end which encloses a suitable torque motor 137 operated by the differential between the variable transformer outputs 138 and 139. The torque motor is connected to and rotates an inner valve sleeve 140 which is closed at both ends and is provided with diametrically opposed inlet ports 141 and 142. Normally these ports are blocked because of the position of the rotary sleeve 140 in a surrounding sleeve 143 mounted stationarily within the valve casing 135, as shown in FIG. 9. However, bypassed brake fluid entering the valve casing through the inlet port 144 passes through an annular passage 145 and through diametrically opposed inlet ports 146 in the stationary sleeve 143 and when the rotary valve sleeve 140 is rotated in either direction by a sufficient amount, the ports 141 and 142 come into registry with the ports 146 to admit the brake fluid to the interior of the rotary valve sleeve 140. This fluid then passes out of the inner sleeve 140 through diametrically opposed ports 147 registering with ports 148 in the stationary sleeve 143 which are connected by an annular channel 149. Thus the bypassed brake fluid escapes from the rotary valve sleeve to the outlet port 150 in the valve casing to which the sump connection is made. Accumulation of fluid and build up of pressure in the ends of the stationary sleeve 143 can be prevented in any desired manner, as by providing suitable drain passages such as the passage 151.

The principal advantages of a system embodying the above invention will be apparent. It is extremely simple, requiring only two Microsyns and associated electronics or their equivalents and the valve assembly, and correspondingly light in weight. Moving parts, friction and inertia effects are reduced to the minimum, and the only other moving parts are in the valve unit itself. Furthermore, in those valve arrangements having two parts moving synchronously in the same direction, it is not necessary to rely on a mechanical or electrical force equivalent only to the difference between the two transformer outputs, however, it is possible instead to utilize the entire output of one transformer to move one valve part and the entire output of the other transformer to move the other valve part. In the latter case the static accuracy of positioning the rotatable valve parts relative to one another as well as with respect to the stationary valve sleeve, may be superior.

An overall novel and distinguishing feature of the invention embodied in the systems of FIGS. 1 and 2 is that the two signals, which are proportional respectively to angular and linear accelerations, are not combined either electrically or mechanically until the point is reached where the summation of mechanical positions of the valve parts results in a valve port opening which in turn results in a controlled fluid pressure. The end result of this conception is the possible realization of greater accuracy.

FIGS. 10–14, inclusive, illustrate in somewhat diagrammatic fashion another embodiment of the invention in which use is made of strain gages for developing electrical outputs that are proportional, respectively, to angular deceleration and linear deceleration of the wheel.

FIG. 10 shows by way of example a known type of strain gage that can be employed for the above purpose. It comprises a base 152 of any suitable material such as paper, plastic, etc., to which a wire grid 153 is bonded in any suitable manner, the end wires of the grid being connected to leads 154 through which current is conducted to and from the grid. As will be understood, the resistance of the grid varies when the wire of the grid is strained as, for example, by bending the grid. Various types of such devices are well known and can be substituted for the device shown in FIG. 10.

FIG. 11 shows diagrammatically one way of using such strain gages in connection with a vehicle wheel, a portion of which is shown at 155, and its axle the end of which is indicated in dot and dash lines at 156. A member 157 serves to attach a casing 158 to the end of the axle and houses a mounting block 159 to which one end of a cantilever spring 160 is attached. An inertia mass 161 is carried by the free end of the cantilever spring and the spring is disposed in such a way that the mass 161 can move forwardly with the wheel in linear motion, and either forward or backward relative to the wheel in the case of linear deceleration or acceleration of the wheel, respectively.

Strain gages are mounted on the cantilever spring 160 preferably at positions close to the mounting block 159 at which the greatest bending moment of the spring blade takes place. Preferably and as shown, two such strain gages 162 and 163 are mounted on one side of the spring blade, and two similar gages (not shown) are mounted on the opposite side of the spring blade and are hereinafter referred to by the numerals 164 and 165 (see FIG. 14).

It will be understood that the strain gages 162–165 can be energized from any suitable source of power on the vehicle such as a generator, a storage battery, a lighting circuit, etc. Referring to FIG. 14, such energization is indicated by the word "input" and the input leads 166 and 167 connect the input to opposite corners of a Wheatstone bridge. Each arm of this bridge includes one of the four strain gages 162–165 described above. It will be understood that since the gages 162 and 163 on one side of the cantilever spring are in compression, while the gages on the other side are in tension, the algebraic signs of the changes in electrical resistance of the wire grids will differ. By properly connecting these grids in the arms of the Wheatstone bridge, the bridge output measured across the output leads 168 will represent a summation of the individual effects of all four gages in the case of linear acceleration, but will be zero insofar as angular acceleration is concerned because the linear acceleration sensor does not rotate.

It will be understood, of course, that the cantilever spring 160 need not extend horizontally from its mounting block, but can depend therefrom in a vertical position, and also that it need not be aligned with the axis of the wheel, so long as it moves linearly with the wheel and the inertia mass 161 is free to move linearly either forward or backward relative to the wheel.

In the case of angular deceleration of the wheel, it is convenient to make use of a similar arrangement of four gages and a Wheatstone bridge. By way of example, the gages can be mounted on a spider 169 having arms that are secured in any suitable manner to the wheel, as by bolting them at 170 to the wheel part 155. In this case, however, it is preferable to mount the two pairs of strain gages on diametrically opposite arms of the spider rather than on opposite faces of the same arm. As shown in FIGS. 12 and 13, small housings 171 are mounted on the opposite ends of two diametrically opposed arms of the spider. Each of these housings or casings contains a mounting block 172 or 173, and each mounting block carries a cantilever spring 174 or 175 and an intertia mass 176 or 177, the arrangement being similar to that described above in connection with the block 159, spring 160 and interia mass 161.

It will be seen that as the spider rotates with the wheel 155 around the axle 156, say in a clockwise direction as viewed in FIG. 12, there will be a tendency in case of wheel deceleration for the inertia masses 176 and 177 to move ahead relative to the spider due to inertia and thus to cause flexure of the spring blades 174 and 175. Strain gages 178 and 179 are mounted on opposite sides of the spring blade 174 and strain gages 180 and 181 are mounted on opposite sides of spring blade 175. Thus the gage 178 will be in compression and the gage 179 will be in tension, while the gage 180 will be in tension and the gage 181 in compression. It will be evident to those skilled in the art that by suitable connection of these gages in a Wheatstone bridge such as that shown in FIG. 14, with due regard to the algebraic signs of the changes in resistance of the strain gages, the output voltage will again represent a summation of the individual effects of all four gages.

On the other hand, effects of linear acceleration or deceleration are cancelled out because both masses 176 and 177 tend to move in the same direction relative to the wheel axis and therefore in opposite directions with regard to wheel rotation.

Connections to the gages on the rotating spider can be made in any desired manner, and the drawing indicates diagrammatically a "slip ring assembly" part of which is carried by the non-rotating drum 182, mounted in the casing 183 secured to casing 158. The other part of the slip ring assembly is carried by a ring 184 secured by bolts 185 to the rotating spider 169 and surrounding the end of the drum 182.

It will be understood that the electrical outputs generated in either of the embodiments described above can be used in ways other than those illustrated in FIGS. 1–9, inclusive. By way of example, these outputs can be used to control the positions of flappers in hydraulic amplifiers of known types, the amplified hydraulic forces being then used to operate suitable hydraulic servo valves.

It will also be understood that while the invention is well adapted for use in connection with airplane brakes, it is by no means limited to this application and can obviously be used to advantage in connection with the wheel brakes of any wheeled vehicle or carrier. As an illustration, the relatively high speed rubber-tired cross-country buses now in widespread use often encounter problems of wheel braking and/or skidding for which a brake control embodying the present invention is very advantageous.

It will be further understood that the invention is not limited to the embodiments particularly described above and illustrated in the drawing, but is capable of various modifications that will now suggest themselves to those skilled in the art. Reference should therefore be had to the appended claims for a definition of the limits of the invention.

What is claimed is:

1. In a braking system for a wheeled vehicle having a pressure-operated brake, the combination of pressure supply means, a normally closed bypass valve connected thereto, said valve having parts movable relatively to one another to a relative position in which said valve opens to reduce the brake pressure, electrical valve actuating means for moving said valve parts relatively to one another to said position in response to a predetermined difference between linear and angular accelerations of a vehicle wheel, accelerometer means for producing electrical outputs proportional respectively to said linear and angular accelerations and comprising three accelerometers, one of said accelerometers being responsive to linear acceleration and producing said output proportional to linear acceleration, the other two accelerometers being responsive to both linear and angular accelerations and being connected to cancel linear acceleration effects and to produce said output proportional to angular acceleration, said valve actuating means being energized by said outputs to move said valve parts to said open position when the difference between said outputs reaches a predetermined value and increase of said difference above said predetermined value causing a corresponding increase in valve port opening and reduction of brake torque to limit slippage and return said valve parts toward closed position.

2. In a braking system for a wheeled vehicle having a pressure operated brake, the combination of pressure supply means, a normally closed bypass valve connected thereto, said valve having parts movable relatively to one another to a relative position in which said valve is open to reduce the brake pressure, angular accelerometer means associated with a wheel and comprising strain gage means mounted for rotation with the wheel and means responsive to changes in angular velocity of the wheel for straining said gage means, linear accelerometer means comprising strain gage means mounted for linear travel with the wheel and means responsive to changes in linear velocity of the wheel for straining said gage means, electrical circuitry including a source of input power, said strain gage means, and electrical output connections for producing electrical outputs proportional respectively to angular deceleration and linear deceleration of said wheel, and electrical valve actuating means energized by said outputs for moving said valve parts relative to one another by an amount proportional to the difference between said outputs, said valve parts moving to initial opening position when said difference reaches a predetermined value, and increase of said difference above said predetermined value causing a corresponding increase in valve port opening and reduction of brake torque to limit slippage and return said relatively movable parts toward said initial opening position, said first strain gage means comprising a pair of strain gages mounted diametrically opposite one another with reference to the wheel axis about which they rotate.

3. In a braking system for a wheeled vehicle having a pressure operated brake, the combination of pressure supply means, a normally closed bypass valve connected thereto, said valve having parts movable relatively to one another to a relative position in which said valve is open to reduce the brake pressure, angular accelerometer means associated with a wheel and comprising strain gage means mounted for rotation with the wheel and means responsive to changes in angular velocity of the wheel for straining said gage means, linear accelerometer means comprising strain gage means mounted for linear travel with the wheel and means responsive to changes in linear velocity of the wheel for straining said gage means, electrical circuitry including a source of input power, said strain gage means, and electrical output connections for producing electrical outputs proportional respectively to angular deceleration and linear deceleration of said wheel, and electrical valve actuating means energized by said outputs for moving said valve parts relative to one another by an amount proportional to the difference between said outputs, said valve parts moving to initial opening position when said difference reaches a predetermined value, and increase of said difference above said predetermined value causing a corresponding increase in valve port opening and reduction of brake torque to limit slippage and return said relatively movable parts toward said initial opening position, said first strain gage means comprising flexure members mounted diametrically opposite one another on the wheel and having their free ends extending radially inward from their mountings and carrying inertia masses, strain gages being mounted on said flexure members in position to be subjected to strain upon flexure thereof.

References Cited by the Examiner

UNITED STATES PATENTS

| | | | |
|---|---|---|---|
| 2,039,701 | 5/1936 | Bush | 303—21 |
| 2,403,952 | 7/1946 | Ruge | 73—517 X |
| 2,441,869 | 5/1948 | Childs | 340—315 X |
| 2,487,793 | 11/1949 | Esval et al. | 318—489 |
| 2,505,636 | 4/1950 | Carter | 73—517 X |
| 2,536,805 | 1/1951 | Hansen | 340—315 X |
| 2,892,660 | 6/1959 | Reswick et al. | 303—21 |
| 2,907,607 | 10/1959 | Williams | 188—181 X |
| 2,920,924 | 1/1960 | Reswick et al. | 188—180 X |
| 2,933,298 | 4/1960 | Allison | 73—503 |
| 2,992,860 | 7/1961 | Hirzel | 303—24 |
| 3,022,114 | 2/1962 | Sampietro | 303—21 |
| 3,049,685 | 8/1962 | Wright. | |

FOREIGN PATENTS 763,225 12/1956 Great Britain.

EUGENE G. BOTZ, *Primary Examiner.*